Patented Sept. 15, 1953

2,652,431

UNITED STATES PATENT OFFICE

2,652,431

PROCESS FOR SEPARATING β-CHLORO-α-ALKOXYETHYLBENZENES FROM THEIR REACTION MIXTURE

Frederick Grosser, North Plainfield, N. J., assignor to General Aniline & Film Corporation, New York, N. Y., a corporation of Delaware No Drawing. Application March 7, 1951, Serial No. 214,441

6 Claims. (Cl. 260—611)

This invention relates to a method of producing β-chloro-α-alkoxyethylbenzenes and particularly to an improved process of separating said compounds from the reaction mixture.

β-chloro-α-alkoxyethylbenzenes are highly desired compounds utilized as intermediates in the preparation of various organic compounds. The β-chloro-α-methoxyethylbenzene is especially useful in the preparation of p-nitroacetophenone which is converted to α-bromo-p-nitroacetophenone and the latter utilized as an intermediate in the synthesis of the antibiotic chloromycetin.

The compounds are prepared by halogenating an equimolecular amount of styrene in an excess of a lower alcohol and in the presence of an alkaline medium, such as hydroxides or carbonates of alkali metals or alkaline earth metals. During this initial reaction a lower alkoxy group and a halogen are simultaneously introduced to the vinyl group of the styrene. The character of the lower alkoxy group will depend upon the specific alcohol used which may be methanol, ethanol, propanol, isopropanol, butanol, hexanol, and the like.

The halogenation reaction may be carried out over a wide temperature range, varying from below room temperature but preferably with the temperature range of —5° C. to 30° C. for a time sufficient to permit the equivalent of chlorine to be absorbed.

The alkaline medium is used in an amount in excess to the equimolecular amount of styrene and may be added all at once, portionwise, or by gradual addition. Throughout the main part of the chlorination reaction, the pH remains above 10, and a weak hypochlorite test is obtained as indicated by acidified potassium iodide solution. The addition of chlorine is discontinued when the pH reaches 6 to 7. At this point, continued chlorination does not increase the yield of the desired compound and stronger hypochlorite tests are obtained.

After chlorination is complete, the copious white precipitate is filtered off and washed with a lower alkyl alcohol such as mentioned above. The filtrate at this point may be slightly alkaline, i. e., at a pH between 7 and 8, and is brought back to a pH of 5–6 by the addition of a small amount of concentrated mineral acid.

The lower alkyl alcohol is stripped off through a column at atmospheric or reduced pressure until two layers are formed in the still pot (about 90–95% alcohol is removed). The still residue is either filtered or the liquid layers decanted from the salt and the layers (heavy organic layer and water alcohol layer) allowed to separate. An equal volume of water is then added to the organic layer until a further separation occurs. It is absolutely essential to further wash the heavy organic layer with an equal volume of water two or three times so as to remove dissolved alcohol and salts.

Troublesome emulsions are encountered in the washing procedure, making it very difficult and time consuming to separate the desired product satisfactorily. Another disadvantage of this isolation procedure is the tendency of the product to decompose when the distillation of the alcohol is allowed to proceed too far.

I have discovered that β-chloro-α-alkoxyethylbenzenes can be isolated from the reaction mixture in improved quality and quantity by merely adding one-half volume of water to the entire reaction mixture, with agitation, and allowing the liquid layers to separate. This quantity of water is sufficient to completely dissolve all of the salt, and solution is effected very rapidly due to the finely divided form in which the salt is present. The separation of liquid phases is rapid and clean. The lower product layer, after separation from the aqueous phase, is freed of alcohol by washing once or twice with an equal volume of water. This procedure completely eliminates the necessity for filtration and distillation of the reaction mixture. No emulsions are formed by this procedure. The addition of more water to the water alcohol layer does result in the separation of a small amount of a white flocculent slimy solid. It is this material which, when thrown out of solution, produces the troublesome emulsions encountered in the former isolation procedure. Inasmuch as the addition of a limited amount of water to the reaction mixture before the alcohol has been removed allows this material to remain in solution, troublesome emulsions are completely avoided. The alcohol can be very readily recovered from the alcohol water layer by distillation in at least 85–90% yield.

The utilization of the foregoing improved procedure has the following advantages:

1. The time and labor involved are greatly reduced.
2. All filtration is eliminated.
3. Distillation is eliminated, thus avoiding the danger of thermal decomposition of the product, and resulting in a lighter colored product.
4. Troublesome emulsions are avoided, greatly facilitating the separation of the product from the aqueous phase.

5. Separations are cleaner, necessitating less water washing of the product and resulting in substantially higher yields of the desired product.

The following examples are illustrative of the improved method in separating the compounds from the reaction mixture.

EXAMPLE I

β-Chloro-α-methoxyethylbenzene

To a mixture consisting of 9.6 parts of sodium hydroxide in 80 parts of methanol, 20.8 parts of redistilled styrene were added and the mixture chilled to 0° C. Chlorine gas was passed into the mixture with stirring at +5 to −5° C. until 16.2 parts of chlorine had been absorbed. To the reaction mixture were added, with agitation, 60 parts of water. The suspended salt dissolved immediately and after a minute or two of agitation the liquid layers were allowed to separate. The product layer was drawn off and freed of alcohol by washing once with an equal volume of water. 32.4 parts of product were obtained, corresponding to a yield of 95%.

EXAMPLE II

β-Chloro-α-ethoxyethylbenzene

To a mixture of 9.6 parts of sodium hydroxide in 100 parts of ethanol were added 20.8 parts of redistilled styrene and the resultant mixture was chilled to 0° C. Chlorine gas was passed into this mixture with stirring at +5 to −5° C. until 16.5 to 17 parts of chlorine had been absorbed. To the reaction mixture were added 75 parts of water and agitation was maintained until all the salt had dissolved. The liquid layers were allowed to separate. The lower product layer was drawn off and freed of alcohol by washing once with an equal volume of water.

EXAMPLE III

β-Chloro-α-n-propoxyethylbenzene

To a mixture of 9.6 parts of sodium hydroxide in 120 parts of n-propanol were added 20.8 parts of redistilled styrene and the resultant mixture chilled to 0° C. Chlorine gas was passed into this mixture with stirring at +5 to −5° C. until 16.5 to 17 parts of chlorine had been absorbed. To the reaction mixture were added 90 parts of water and agitation was maintained until all the salt had dissolved. The liquid layers were then allowed to separate. The lower product layer was drawn off and freed of alcohol by washing twice with an equal volume of water.

EXAMPLE IV

β-Chloro-α-isopropoxyethylbenzene

To a mixture of 9.6 parts of sodium hydroxide in 120 parts of isopropanol were added 20.8 parts of redistilled styrene and the resultant mixture chilled to 0° C. Chlorine gas was passed into this mixture with stirring at +5 to −5° C. until 16.5 to 17 parts of chlorine had been absorbed. To the reaction mixture were added 95 parts of water and agitation was maintained until all the salt had dissolved. The liquid layers were then allowed to separate. The lower product layer was drawn off and freed of alcohol by washing once with an equal volume of water.

EXAMPLE V

β-Chloro-α-tert.-butoxyethylbenzene

To a mixture of 9.6 parts of sodium hydroxide in 140 parts of tert.-butanol were added 20.8 parts of redistilled styrene at about 25° C. Chlorine gas was passed into this mixture with stirring at 20 to 30° C. until 16.5 to 17 parts of chlorine had been absorbed. To the reaction mixture were added 110 parts of water and agitation was maintained until all the salt had dissolved. The liquid layers were then allowed to separate. The lower product layer was drawn off and freed of alcohol by washing twice with an equal volume of water.

While I have disclosed the preferred embodiments of my invention, it will be readily appreciated that many changes and variations may be made therein without departing from the spirit thereof. Accordingly, the scope of the invention is to be limited solely by the appended claims.

I claim:

1. In the process of preparing β-chloro-α-alkoxyethylbenzenes by chlorinating an equimolecular amount of styrene in a lower alkyl alcohol in the presence of an alkaline reagent at a temperature of −5 to 30° C. for a time sufficient to permit the equivalent molecular amount of chlorine to be absorbed with the formation of a solid reaction product, the improvement which comprises treating the reaction mixture with a volume of water equal to one-half the volume of the reaction mixture, to dissolve the solid and cause the liquid to separate into two liquid layers, the heavy layer containing the product and the top layer containing alcohol-water, separating the layers, and washing the lower layer at least once with water.

2. The process according to claim 1, wherein the lower alkyl alcohol is methanol.

3. The process according to claim 1, wherein the lower alkyl alcohol is ethanol.

4. The process according to claim 1, wherein the lower alkyl alcohol is n-propanol.

5. The process according to claim 1, wherein the lower alkyl alcohol is isopropanol.

6. The process according to claim 1, wherein the lower alkyl alcohol is tert.-butanol.

FREDERICK GROSSER.

References Cited in the file of this patent

UNITED STATES PATENTS

| Number | Name | Date |
| --- | --- | --- |
| 1,968,601 | Edlund et al. | July 31, 1934 |
| 2,159,364 | Coleman et al. | May 23, 1939 |
| 2,425,426 | Joyce | Aug. 12, 1947 |
| 2,573,080 | Wilkinson et al. | Oct. 30, 1951 |
| 2,619,505 | Wilkinson et al. | Nov. 25, 1952 |

OTHER REFERENCES

Irwin et al., Jour. Am. Chem. Soc., vol. 63, pages 858–860 (1941).